(12) United States Patent
Ledwon

(10) Patent No.: US 11,766,655 B2
(45) Date of Patent: *Sep. 26, 2023

(54) METHOD FOR CONTROLLING A CHEMICAL REACTION AND APPARATUS FOR CARRYING OUT SAID METHOD

(71) Applicant: Heion GmbH, Siblin (DE)

(72) Inventor: Anton Ledwon, Troisdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,081

(22) Filed: May 24, 2021

(65) Prior Publication Data
US 2022/0023818 A1 Jan. 27, 2022

Related U.S. Application Data

(63) Continuation of application No. 16/064,530, filed as application No. PCT/EP2016/082154 on Dec. 21, 2016, now Pat. No. 11,014,060.

(30) Foreign Application Priority Data

Dec. 23, 2015 (DE) .................. 10 2015 122 711.8
Jan. 15, 2016 (DE) .................. 10 2016 100 620.3

(51) Int. Cl.
*B01J 19/00* (2006.01)
*B01J 19/28* (2006.01)
*B01J 19/08* (2006.01)
*B01J 19/18* (2006.01)

(52) U.S. Cl.
CPC ............ *B01J 19/008* (2013.01); *B01J 19/002* (2013.01); *B01J 19/087* (2013.01); *B01J 19/18* (2013.01); *B01J 19/1812* (2013.01); *B01J 19/28* (2013.01); *B01J 2203/00* (2013.01); *B01J 2219/00162* (2013.01); *B01J 2219/00488* (2013.01)

(58) Field of Classification Search
CPC ........ C10G 23/02; B01J 29/002; B01J 29/008
See application file for complete search history.

(56) References Cited

U.S. PATENT DOCUMENTS

| 3,410,661 A | 11/1968 | Taylor |
| 3,534,090 A | 10/1970 | Bryant et al. |
| 4,127,332 A | 11/1978 | Thiruvengadam et al. |
| 2012/0305383 A1* | 12/2012 | Sorokin ................. C10G 32/02 422/128 |
| 2013/0092602 A1 | 4/2013 | Zhu et al. |

FOREIGN PATENT DOCUMENTS

| DE | 1964916 | 7/1970 |
| DE | 2109027 | 9/1971 |
| DE | 2446089 | 4/1976 |
| DE | 2943984 | 5/1981 |

(Continued)

OTHER PUBLICATIONS

Jiang Honghui, Industrial Boiler Technology Encyclopedia, Dec. 1990, Science Popularization Press, Haidian District, Beijing, China.

*Primary Examiner* — Renee Robinson
(74) *Attorney, Agent, or Firm* — Burr & Forman LLP; Douglas L. Lineberry

(57) ABSTRACT

The invention relates to a method for controlling a chemical reaction which creates a product, wherein at least one reactant that is present in a liquid phase is subjected to a pressure change.

10 Claims, 6 Drawing Sheets

(56) References Cited

FOREIGN PATENT DOCUMENTS

| | | |
|---|---:|---:|
| DE | 4016076 | 8/1991 |
| DE | 10002025 | 8/2001 |
| DE | 102008030035 | 2/2010 |
| EP | 2216312 | 8/2010 |
| EP | 2551012 | 1/2013 |
| WO | WO-2009145954 | 12/2009 |

* cited by examiner

METHOD FOR CONTROLLING A CHEMICAL REACTION AND APPARATUS FOR CARRYING OUT SAID METHOD

BACKGROUND OF THE INVENTION

1) Field of the Invention

The present invention relates to a method for controlling a chemical reaction. In addition, the invention relates to an apparatus which can be used to carry out the method.

2) Description of Related Art

The rules of chemical reactions are generally known. The subject matter claimed herein falls under synthesis reactions aimed at producing a required product. This general technical field for example includes DE 1964916 A, which describes the reforming of hydrocarbons. Here, a gas mixture is partially combusted and the waste heat used for parallel thermal decomposition of the gas mixture at an extremely high pressure. Controlling the reaction pressures and gas composition here results in controlling the chemical reaction.

In the same sense, DE 2109027 A describes a catalyst carrier where the properties were altered so that a reaction can take place on the carrier in the desired manner. However, here the general technical area does not cover systems where cavitation of a liquid phase could occur. The subject matter claimed herein is specifically targeted at this area. Methods of this nature involve reaction mixtures which at least in part may be subject to cavitation of at least one liquid phase during the reaction.

In this respect, U.S. Pat. No. 4,127,332 A for example shows a method and an apparatus where a multi-component stream of partly liquid phases are subjected to a strong pressure change and the associated cavitation, allowed to react and is homogenized. However, cavitation introduces an extreme energy peak in a reaction and may therefore deteriorate the yields. Accordingly, DE 2 943 984 A teaches that cavitation within a pumped reaction mixture should absolutely be avoided through appropriate mixtures and controlled delivery volumes. On the other hand there is the model that certain reactions can only take place with reliable and safe cavitation—for example, in DE 4 016 076 A. Additionally, DE 10 2008 030 035 A1 teaches that cavitation erosion can be prevented and cavitation can be put to good use when certain crystals are present in a reaction mixture.

The disadvantage of the known methods is that they must either absolutely rule out or guarantee cavitation. As a result, specific metastable compounds are not accessible or only with poor yield.

Accordingly, it is an object of the present invention to overcome the disadvantages of prior art and to provide a method which despite a controlled reaction process which includes cavitation effects aims to provide precise routes of synthesis and improved yields, particularly for metastable compounds. This object is achieved according to the characteristics of claim 1. Advantageous embodiments result from the dependent method claims and the following description.

SUMMARY OF THE INVENTION

The above objectives are accomplished according to the present invention by providing a method for controlling a chemical reaction which creates a product, wherein at least one reactant that is present in a liquid phase is subjected to a pressure change. According to the invention, the pressure minimum corresponds to a maximum 105%, preferably no greater than 103%, and especially preferably no greater than 101% of the cavitation pressure of the reactant, without causing cavitation in the reactant. The invention provides a method which permits improved kinetic control, achieved by conducting a reaction close to the cavitation point, preferably supported by suitable frequencies, electrical fields and/or currents. Thus, kinetically controlled products, which as metastable, reactive compounds, are more valuable and more versatile in terms of their application, can thus be obtained with improved yields and at low cost. In particular, fuels can be refined cost-effectively in such a manner. In addition, the invention relates to an apparatus (201) which can be used to carry out the method according to the invention.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
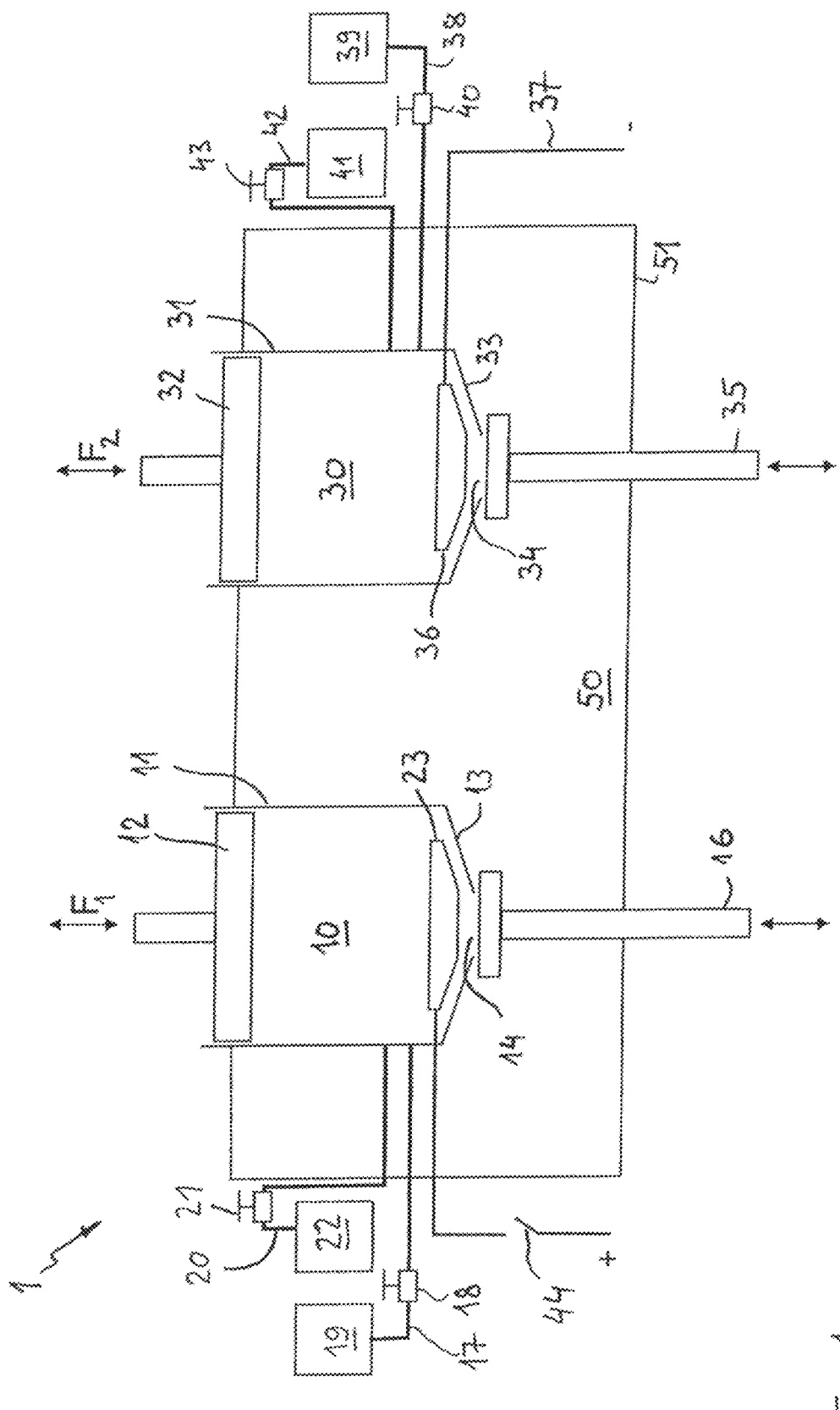
FIG. 1 shows a schematic of an apparatus for carrying out the process according to the invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention relates to a method for controlling a chemical reaction which creates a product, wherein at least one reactant that is present in a liquid phase is subjected to a pressure change. According to the invention, the pressure minimum corresponds to a maximum 105%, preferably no greater than 103%, and especially preferably no greater than 101% of the cavitation pressure of the reactant, without causing cavitation in the reactant. The invention provides a method which permits improved kinetic control, achieved by conducting a reaction close to the cavitation point, preferably supported by suitable frequencies, electrical fields and/or currents. Thus, kinetically controlled products, which as metastable, reactive compounds, are more valuable and more versatile in terms of their application, can thus be obtained with improved yields and at low cost. In particular, fuels can be refined cost-effectively in such a manner. In addition, the invention relates to an apparatus (201) which can be used to carry out the method according to the invention.

The invention proposes a method for controlling a chemical reaction which produces a product where at least one reactant which is liquid in the liquid phase or a multicomponent reaction mixture comprising a multitude of reactants, at least one of which is in its liquid phase, is subjected to a change in pressure with a pressure minimum not to exceed 105%, preferably at most 103%, more preferably at most 101% of the cavitation pressure of at least one reactant without causing cavitation of the reactant.

The cavitation should be the pressure at which the reactant enters the vapor phase (vapor pressure). In the case of several reactants the cavitation pressure is the pressure at which one of the reactants first forms small vapor bubbles which implode when the pressure of the reaction mixture rises again. The imploding vapor bubbles lead to unwanted pressure peaks. However, the emergence and implosion of vapor bubbles generate heat or degradation of energy which is not desired in line with this invention and should be virtually impossible. The vapor pressure of the liquid phase may deviate from the vapor pressure of the reaction mixture, even if this liquid phase is the only liquid phase in this reaction mixture.

The following assumes a reaction mixture with a plurality of components which will produce the product by chemical reaction. But the invention also includes only one reactant being chemically converted into the desired product. For example, hydrogen can be obtained from water. The below explanations about the reaction mixture should analogously apply to a chemical process with only one reactant or starting material.

It was first found that near the cavitation pressure, a sudden increase of yields/reaction rates can be effected. It is essential that no cavitation takes place where energy in the form of heat is released in the mixture by pressure-volume work. The closer the pressure minimum to be controlled during the reaction is brought to the cavitation pressure, the greater the yield of desired product. In one illustrative embodiment the minimum is only 100.5 or 100.3%, i.e. the pressure is practically at cavitation pressure without reaching the latter.

It is assumed that near the cavitation pressure rapidly rising kinetic control of the reaction becomes available: certain reaction paths are then significantly faster and allow a kinetically induced, effective increase in the yields of certain metastable reaction products. Once cavitation and the associated heating of the mixture occur, this effect collapses, producing many more products which from a thermodynamics perspective represent the more stable compounds. Hence, the proposed method allows metastable, reactive compounds which prior art could not produce in the respective yields.

A pressure difference between the minimum and the cavitation pressure may be less than 20 mbar. In an illustrative embodiment the pressure difference is 4-15 mbar. The small pressure differences require maintaining or regulating an exact pressure of the reaction mixture.

In one illustrative embodiment the pressure is reduced from an initial value to the minimum and then increases to a target value, which can essentially correspond to the start value. For example, the start value may correspond to the ambient pressure of approx. 1000 mbar. However, the start value can be significantly higher than the ambient pressure, for example 2 to 10 bar. The cavitation pressure and thus the minimum, which is very close to this, depend on the temperature of the reaction mixture and the percentages of the individual components in the reaction mixture. In addition, the cavitation pressure also depends on other external factors.

To illustrate the percentages under claim 1, an exemplary embodiment is assumed where the cavitation pressure should be 350 mbar. Assuming a start value of about 1 bar or 1000 mbar the pressure for the chemical reaction is reduced to 355 mbar then increased again. The pressure minimum through corresponds to 355 mbar and is thus 5 mbar above the cavitation pressure. Stated as a percentage the pressure minimum is 101.43% (355/350). If the pressure minimum is only 352 mbar (in this case, the pressure will be brought even closer to the cavitation pressure), the value would be 100.57% (352/350) relative to the cavitation pressure. The minimum of 100.57% is then below 101%, i.e. in the latter example the condition of the minimum not exceeding 101% of the cavitation pressure would be met.

The time to reduce the pressure from the start value to the minimum may be less than the time for increasing the pressure from the minimum to the target value. Provision may also be made to reduce the pressure during the first phase, to essentially keep the pressure near the cavitation pressure during the second phase, and in a third phase increasing the pressure again or the reaction mixture is again eased in a controlled manner. This type of reaction can be illustrated by a down-slope, a lower level and an up-slope. Another reaction provides that the second phase is virtually non-existent. After reaching the pressure minimum this would immediately start relaxing the system so that the time-dependent pressure curve has a singular low point.

Suitable means can be used to set the reaction mixture into vibration. This can be done for example using mechanical vibrations, sound waves or electromagnetic waves. The frequency of the pulses depends on the reaction mixture and the desired product. The amplitude of the pulses should be such that no cavitation occurs. The form and nature of the pulses can be vary. For example, it may be a sawtooth, a sinusoidal or rectangular vibration applied to the reaction mixture externally.

The chemical reaction may be brought about in a reaction chamber where a volume of the reaction chamber is varied. A movable piston can be used to vary the volume. This causes that for example increasing the volume reduces the pressure throughout the reaction chamber. The piston movement introduces no or virtually no kinetic energy into the reaction mixture to cause significant flows or movements inside the reaction chamber. Thus, the reaction takes place without (macroscopic) motion of the reaction mixture or its components. Another means for varying the volume is a membrane which limits the reaction chamber and can deform inward or outward. The pressure in a reaction chamber can also be varied by increasing or pumping out a portion of the reaction mixture.

Another option is to feed the reaction mixture through a system accelerating means such as a nozzle to bring the static pressure of the reaction mixture near the cavitation pressure. But for the purpose of a high product yield this also requires precise control of the (static) pressure as the reaction mixture must lose speed too quickly after passing through the nozzle, which would lead to the pressuring increasing too rapidly.

Another option is adding the reaction mixture to the reaction chamber in partly frozen form (hereinafter simply referred to as ice) and closing the reaction chamber after preferably filling it all the way. The ice melting will cause vacuum inside the reaction chamber, where the melting process can be accelerated with an additional external heat input. However, the ice can also be allowed to melt at room temperature (e.g. 20° C.) without a separate heat source. The temporal course and level of the vacuum can be predetermined through temperature control, the amount of ice in relation to the total amount of the reaction mixture. This can be used to control the product to be produced. This option is particularly suitable to produce amino acids and vitamin B.

The method may be designed as a batch process. In this case, a limited amount of the reaction mixture or limited amounts of the individual components is added to the system as a whole and removed from it as a whole at the end of the process. For example, in the embodiment where the movement of the piston changes the volume of the reaction chamber, the piston can draw the components into the reaction chamber before the chemical reaction occurs and then push the product out of the reaction chamber after the reaction. This can then be repeated for each additional batch. The amounts can also be fed into the system in batches using external conveying means such as pumps and withdrawn again after the reaction.

Alternatively, the method according to the invention can also be designed as a continuous process. In this case the reaction mixture may be continuously passed through the above system using the flow accelerating means.

In one embodiment, the cavitation pressure of the reaction mixture is repeatedly determined at regular intervals. For example, the intervals can be less than 30 minutes, preferably less than 10 minutes or even 30 seconds. Since according to the invention the pressure minimum value of the reaction mixture should be brought very close to the cavitation pressure but not fall below it, it's important to know the exact cavitation pressure. The invention has shown that if the state variables of the reaction mixture (composition of the individual components, temperature, degree of mixing) the cavitation pressure is subject to temporal fluctuations. It is therefore helpful to not only base the pressure minimum to be regulated on the state variables of the reaction mixture, but on the real time cavitation pressure. The cavitation pressure is preferably determined by measurement. For example, with the piston embodiment any x-th charge may (for example 5-th, 10-th or every 100-th) be used to measure the cavitation pressure. Here, the pressure is reduced far enough and slightly increased again until cavitation can be determined through pressure peaks or other phenomena. The corresponding pressure value can then be used for additional batches to determine the pressure minimum.

In one embodiment, the cavitation pressure is determined continuously, which is particularly beneficial in a continuous process. Thus, the pressure value for the reaction mixture when vapor bubbles, which are unwanted according to the invention, occur is always current. The minimum pressure and/or the temporal course of the pressure of the reaction mixture can be regulated based on the determined cavitation pressure. The appropriate cavitation pressure is determined so the cavitation pressure is not reached during the actual chemical conversion. In a continuous process the cavitation pressure could therefore be determined inside a bypass connected in parallel to the main path of the process and where a separate control reduces the pressure until it is in fact the same as or below the cavitation pressure. The results which can be derived from this can then be used directly in the process control in the main path.

Using the above example where the cavitation pressure is (during initial measurement) at 350 mbar, the pressure minimum could therefore be regulated to 353 mbar for an absolute difference of 3 mbar. The minimum can be regulated for example controlling valves, pistons etc. If a new measurement shows the cavitation pressure has now decreased to 347 mbar due to various factors, the full details of which are not required, the minimum can be updated accordingly and for example also decreased by 3 mbar. If, however, the cavitation pressure is determined to be 355 mbar, the pressure minimum can be set to at least 356 mbar or, to continue to ensure an absolute difference of 3 mbar, to 358 mbar.

Parallel to the reaction an electrochemical potential and/or an electric current/voltage may be applied to the reaction mixture. This can particularly be used to align molecules with dipole moment and/or permanent charge and, if necessary, arranged in chains or barriers and opened sterically and/or the surface prepared to benefit a reaction.

In one embodiment the pressure is controlled concomitantly with at least one, preferably multiple successive molecular and/or atomic transfer between components in the reaction mixture.

The method is preferably characterized by that the reaction mixture comprises at least one component selected from the group comprising solid, nanoscale solid, nanoscale silicon, metal hydroxide, metal compound, semimetal compound, ice, ceramic catalyst support, nanoscale catalyst, carbon dioxide, ammonia, hydrogen sulphide, water, carbon disulphide, carbon monoxide, hydrogen, oxygen, nitrogen, generator gas, helium, argon, neon, welding gas, molecules and/or compounds with dipole moment, ionic compounds, salts.

In its liquid phase the reaction mixture may comprise at least one liquid component selected from the group comprising water, carbon dioxide, hydrocarbon, long-chain hydrocarbon, polyol, fat, fatty acid, protein, sugar, sugar esters, amino acid, vitamin, molecules and/or compounds with dipole moment, ionic compounds, salts.

The product may be at least one product selected from the group comprising hydrocarbon, amino acid, protein, peptide, glycerin, fatty acid, fat, sugar, alcohol, vitamin, ammonia, nanoscale solids, nanoscale silicon, petroleum ether, shorter chain shorter chain hydrocarbon, hydrogenated hydrocarbon, molecules and/or compounds with dipole moment, ionic compounds, salts.

A further object of the invention, to provide an apparatus which can carry out the method for controlling a chemical described herein.

The apparatus according to the invention for carrying out the method described herein to control the chemical reaction has a reaction chamber and a drive for rotating said reaction chamber about a rotational axis to reduce the pressure inside the reaction chamber. The pressure reduction can be attributed to the centrifugal force acting on the reactant inside the reaction chamber resp. on the reaction mixture inside the reaction chamber. The apparatus must be such so the centrifugal force causes the desired pressure reduction inside the chamber, for example through at least one outlet through which the product of the chemical and remaining reaction mixture, if applicable, can escape. The invention provides means which allow adding the reaction mixture to the rotating reaction chamber in a direction parallel to the rotational axis and/or in a direction facing radially outward from the rotational axis. The reaction chamber can therefore be rotated and does not need to be stopped for filling. It can preferably be filled without changing the speed (revolutions per time unit) of the reaction chamber. The reaction mixture would be added in a direction which is not opposite to the direction of the centrifugal force. Furthermore—at least in preferred embodiments—the product discharging from the reaction chamber will not hinder filling the reaction chamber.

The filling device may be comprised of at least one valve unit, whereby the pressure inside the reaction chamber can be reduced with the reaction chamber rotating and the valve closed. That is, with the valve unit in the dosed position and the outlet open, rotating the reaction chamber will expel the substances from the reaction chamber, forming a vacuum inside the reaction chamber. In the process the chemical reaction described above the cavitation pressure takes place. When opening the valve unit, thus filling, the pressure inside the reaction chamber rises again.

The device for filling the reaction chamber can be comprised of multiple valve units. For example, one reactant can be passed into the reaction chamber parallel to the rotational axis and another reactant radially from the inside using separate valve unit. It is also possible the reaction mixture is already prepared outside the reaction chamber and passes through various valve units and into the reaction chamber.

The valve unit may be controlled to at all times precisely adjust the regulate the pressure inside the reaction chamber during every phase the chemical reaction. For example, the valve unit may be opened for a certain period at a given speed to fill the reaction chamber. In this case the flow through the valve unit and thus the fill level of the reaction chamber can be precisely controlled. Filling is then followed by the emptying of the reaction chamber by preferably controlled opening of the outlet of the reaction chamber. An overlap could also be provided where the outlet is (already) open and the valve unit is not (yet) closed.

On principle, the apparatus according to the invention can be controlled so the pressure inside the reaction chamber is below the cavitation pressure, so vapor bubbles form and collapse inside the reaction chamber. The apparatus according to the invention is therefore not limited to implementing the method according to the invention. For example, using other set values in the reaction chamber will produce targeted cavitation to for example supply a certain amount of heat for a chemical reaction. Here, the degree of cavitation can be controlled by regulating the valve unit along with the outlet.

It will preferably have means which completely dissipate any gaseous components from the reaction chamber before it is refilled. Any residual gas inside the reaction chamber will result in poor efficiency of the apparatus according to the invention. The means for complete discharge of the gaseous components may include, for example, the respective valve control.

The closed position and/or the open position of the valve unit may vary by the angle of rotation of the reaction chamber. For example, an initial range of rotation may be provided for a rotation of the reaction chamber where the reaction chamber is filled (open valve position). At another rotation point the outlet—with the valve unit closed—is opened so the desired chemical reaction can occur inside the reaction chamber with simultaneous discharge of the product. The two rotation points can add up to 360 degrees. They could also add up to 360/n (natural number n=2, 3, etc.). It could also provide more than two rotation points for a repetitive reaction cycle. Thus, it is conceivable that it will have a third rotation point between the first and the second rotation point where the outlet and the valve unit are both temporarily open.

In one embodiment, the rotational axis intersects the reaction chamber, in which case the reaction chamber may be rotationally symmetric to the rotational axis. The reaction chamber may also be positioned a certain radial distance from the rotational axis.

The reaction chamber may extend along a longitudinal axis that is perpendicular to the rotational axis. The reaction chamber can thereby be delimited by a round pipe, resulting in a circular cross section perpendicular to the longitudinal axis. The reaction chamber can alternatively have a polygonal or oval cross section. Along the longitudinal axis the cross section can be changed with respect to size and/or basic shape.

In one embodiment, the reaction chamber is conical at a radially outer end, reducing the cross-sectional area at that end. The radially outer end can also be fitted with a funnel so that the cross-sectional area increases outward. The design of the reaction chamber will influence those flows conditions and thus on the pressure profile inside the reaction chamber.

FIG. 1 shows the schematics of an apparatus for carrying out the method according to the invention. The apparatus as a whole is labelled with 1. Apparatus 1 is comprised of a first reaction chamber 10 which is delimited by a cylinder 11 and a piston 12 which moves along the central axis of cylinder 11. At the front end 13, the cylinder 11 has an aperture 14 which can be closed by a first main valve 16.

The first reaction chamber 10 can be filled with an initial component of a reaction mixture via a supply line 17, which can be opened and closed via valve 18. Here the initial component is inside a container 19. Here this initial component should be vegetable oil.

An additional supply line 20, which can be opened and closed via the valve 21, connects the first reaction chamber 10 with an additional container 22. The container 22 is intended to hold a product that produced by a chemical reaction inside the first reaction chamber 10.

An anode 23 is located inside the reaction chamber 10 near the front end 13 of the cylinder 11. The anode 23 serves applying an electric potential to the reaction mixture inside the first reaction chamber 10.

The apparatus 1 further comprises a second reaction chamber 30 which is essentially constructed the same as the first reaction chamber 10. Here the reaction chamber 30 is again delimited by a cylindrical chamber wall or cylinder 31, and delimited by a movable piston 32. The front end 33 of the cylindrical transition 31 resp. the cylinder 31 would have an aperture 34 which can be closed by a second main valve 35. Inside the second reaction chamber 30 a cathode 36 would be located which is connected to the anode 23 inside the first reaction chamber via a circuit 37 and a voltage source not shown here.

To fill the second reaction chamber 30 a supply line 38 is provided which connects a container 39 with the second reaction chamber 30. The supply line 38 can be opened and dosed via valve 40. An additional container 41 is intended to hold a product produced by a reaction inside the second reaction chamber 30. The container 41 is connected to the second reaction chamber 30 via a supply line 42 which can be opened and dosed via a valve 43.

When the first main valve 6 and the second main valve 35 are open, the first reaction chamber 10 and the second reaction chamber 30 are connected by fluids via a connecting chamber 50. In one embodiment the connecting chamber 50, which is to be delimited by a sealed container 51, holds water one and the conductivity can be changed with an additive such as salt. With the main valves 16, 35 open, it therefore has a closed circuit between anode 23 and cathode 36 due to the conductive water inside the connecting chamber 50.

To fill the first reaction chamber 10, the valve 18 will be opened to allow the vegetable oil, representing the first component of this reaction mixture, to flow from the container 19 through the supply line 17 into the reaction chamber 10. This can be accomplished using a pump (not shown) and/or the piston 12 which will suction the vegetable oil from a bottom dead center into the first reaction chamber 10 using a movement shown as upward in FIG. 1. The position of the first main valve 16 will control the water flow from the connecting chamber 50 into the first reaction chamber 10 when the piston 12 moves upward, generating a vacuum in the reaction chamber. In this embodiment, water therefore represents a second component in the reaction mixture for producing the desired product inside the first reaction chamber 10.

To ensure the connecting chamber 50 remains preferably completely filled with water, valve 40 is open so water, which should be inside container 39, can flow from the second reaction chamber 30 through the supply line 38 and into the connecting chamber 50. A pump, not shown here, could also pass water from the container 39 through the supply line 38 into the second reaction chamber 30 so that water passes through the open second main valve 35 and into the connecting chamber 50.

After filling both reaction chambers 10, 30, the first reaction chamber 10 will therefore contain a mixture comprising vegetable oil and water. The second reaction chamber will hold water. Both the connecting chamber 50 as well as both reaction chambers 10, 30 should be completely filled with the reaction mixture, water in this instance. The main valves 16, 35 remain open so the water inside the connecting chamber closes the circuit between the anode 23 and the cathode 36. The volume of the first reaction chamber 10 and the volume of the second reaction chamber 30 is now increased by the upward motion of the pistons 12, 32 as shown in FIG. 1. This requires a force F in each case, wherein the force F1 applied to the piston 12 should be as high as the force F2 applied to the piston 32. Due to the equality of the forces F1, F2 there is virtually no exchange of liquids between the chambers 10, 30, 50 when the pistons 12, 32 are moved up.

The increase in volume in the first reaction chamber 10 will reduce the pressure on the reaction mixture remaining in the reaction chamber 10. The controlled force F1 resp. F2 will reduce the pressure so the pressure minimum inside the reaction chamber 10 is only a few millibars (for example 1 to 8 mbar) above the cavitation pressure of the reaction mixture. That is, the pressure in the first reaction chamber 10 is reduced to virtually reach the cavitation pressure. However, it is important the minimum (pressure minimum) does not quite reach the cavitation pressure to prevent vapor bubbles from forming and subsequently imploding in the reaction mixture. After reaching the minimum, the piston is moved back again to release the vacuum inside the reaction chamber 10.

At about the time when the pressure minimum is reached inside the first reaction chamber 10, the first main valve 16 is dosed. The dosing of the first main valve 16 can coincide with the time the minimum is reached or within a few milliseconds thereof (for example 0 to 30 ms). Closing the first main valve 16 will also open the electric circuit between the anode 23 and cathode 36. This means that upon reaching the pressure minimum in the first reaction chamber 10 the voltage between anode 23 and cathode 36 will also be interrupted. A switch 44 could also be installed to open the circuit between the anode 23 and cathode 36.

Simultaneous to the pressure reduction inside the first reaction chamber, the pressure in the second reaction chamber 30 is also reduced to the same extent. Again, a pressure minimum is reached which due to the open main valves 16, 35 corresponds to the pressure minimum in the first reaction chamber 10. Preferably, cavitation will also not take place in the second reaction chamber 30, although it should be noted that the cavitation pressure in the second reaction chamber 30 may not necessarily be exactly the same as the cavitation pressure in the first reaction chamber 10. This is due to the fact that the cavitation pressure also depends on the composition (one being a reaction mixture comprising water and vegetable oil, the other being water).

Following the chemical reaction in the first reaction chamber 10 this will not hold the product which is more flammable than vegetable oil. Using the piston 12 and with the first main valve 16 open, the first reaction chamber 10 can be emptied completely, in which case the product is pushed into the container 22. The valve 21 upstream from the container 22 will be open at that time, whilst the valve 18 separating the container 19 and the water in it from the reaction chamber 10 is closed. Similarly, the second reaction chamber 30 will be emptied and the water which is now inside it is enriched with oxygen and discharged into the container 41. The valve 43 upstream of container 41 will be opened at that time, and valve 40 closed. The discharge process can now be followed by a filling of the reaction chamber 10, 30 as described above.

Figure 2:
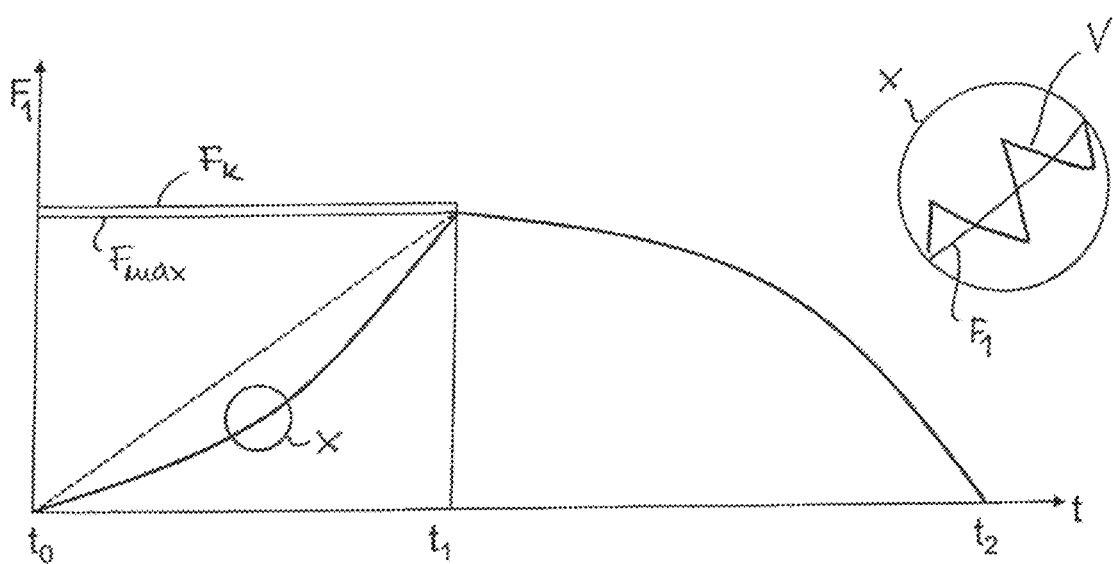
FIG. 2 shows a variation of the force applied to a piston to change the volume inside a reaction chamber.

FIG. 2 shows the temporal course of the force F1 applied to the piston 12 of the first reaction chamber 10. At instant t0, the force F1 should equal 0. The piston 12 will then be pulled to increase the volume of the first reaction chamber 10. The force F1 increases until time t1 leading to a gradually decreasing vacuum inside the first reaction chamber 10. At instant t1 a maximum force Fmax is reached, which is associated with a pressure minimum in the reaction chamber 10. Increasing the force F1 beyond the maximum Fmax, the vacuum would become so strong it would reach or be below the cavitation pressure. This cavitation in the reaction chamber 10 would be associated with a corresponding force FK on the piston 12.

After reaching the maximum Fmax for the force F1 applied to the piston 12 resp. when reaching the pressure minimum in the reaction chamber 10, the piston 12 is slowly be moved back again during the time between t1 and t2. The reaction mixture in the reaction chamber 10 resp. the resulting product in the reaction chamber 10 is depressurized from the piston 12 moving back until it reaches the pressure level prevailing in the reaction chamber 10 at instant t0.

The course of the force F1 compared to the dashed line shows that the force F1 increases exponentially, or that the second derivative of the curve segment between t0 and t1 is greater than or equal to 0. The second derivative of the curve segment between t1 and t2 on the other hand is negative. It should also be noted that the time between t1 and t2 is greater than the time between t0 and t1. This means that depressurization after reaching the pressure minimum takes longer than the previous phase.

For the course of the force F1 a magnified round section X is shown in FIG. 2. The magnified section X shows the force F1 and an oscillation or vibration curve V. In addition to reducing the pressure, the reaction mixture or the reactant can be oscillated by any suitable means. This can be done for example using mechanical vibrations, sound waves or electromagnetic waves. During the time between instant t0 and t1, 2 to 1,000 pulses can be introduced to the system. The frequency of the pulses varies by the material/material composition and the desired product.

Specifically, if the lag between t1 and t0 is small, the separate oscillation or vibration curve V can be omitted.

The amplitude should be such as to prevent cavitation. The form and nature of the pulses can vary. For example, it could be a sawtooth profile (as shown in the schematic in FIG. 2). The pulses can be any other shape, for example sinusoidal or rectangular.

Figure 3:
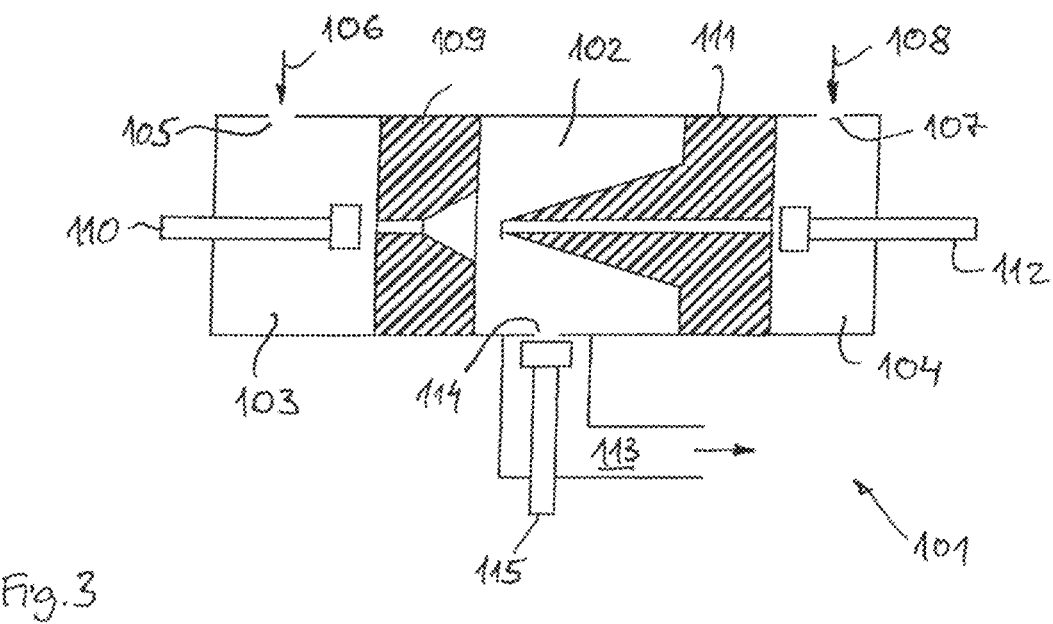
FIG. 3 shows the schematics of an apparatus for continuously carrying out the method according to the invention.

FIG. 3 shows the schematics of an apparatus 101 for continuously carrying out the method according to the invention. The apparatus 101 comprises a reaction chamber 102 and a first pre-chamber 103 and a second pre-chamber 104. The first pre-chamber 103 has an aperture 105 which a pressurized component of the reaction mixture or a partial stream of the reaction mixture passes through and into the first pre-chamber 103. Arrow 106 indicates the corresponding flow through the aperture 105. The second pre-chamber 104 also has an aperture 107, through which, indicated by arrow 108, another component of the reaction mixture or the other partial stream of the reaction mixture passed into the second pre-chamber 104.

The medium inside the first pre-chamber 103 passes through a first nozzle 109 into the reaction chamber 102. A valve 110 can be used to precisely control the flow resistance between the first pre-chamber 103 and the reaction chamber 102. Using a second nozzle 111 the reaction mixture or the component passes from the second pre-chamber 104 to the reaction chamber 102. This also has a valve 112 to control the flow resistance or the flow from the second pre-chamber 104 into the reaction chamber 102.

The product produced by the chemical reaction is removed from the reaction chamber 102 by vacuum inside an outlet 113. Here, the outlet 113 is connected to the reaction chamber 102 via an aperture 114, wherein a valve 115 can close and open said aperture and is designed to control the flow resistance between reaction chamber 102 and outlet 113.

The individual valves 110, 112 and 115 are controlled to create pressure inside the reaction chamber 102 which is very close to but not below the cavitation pressure.

Figure 4:
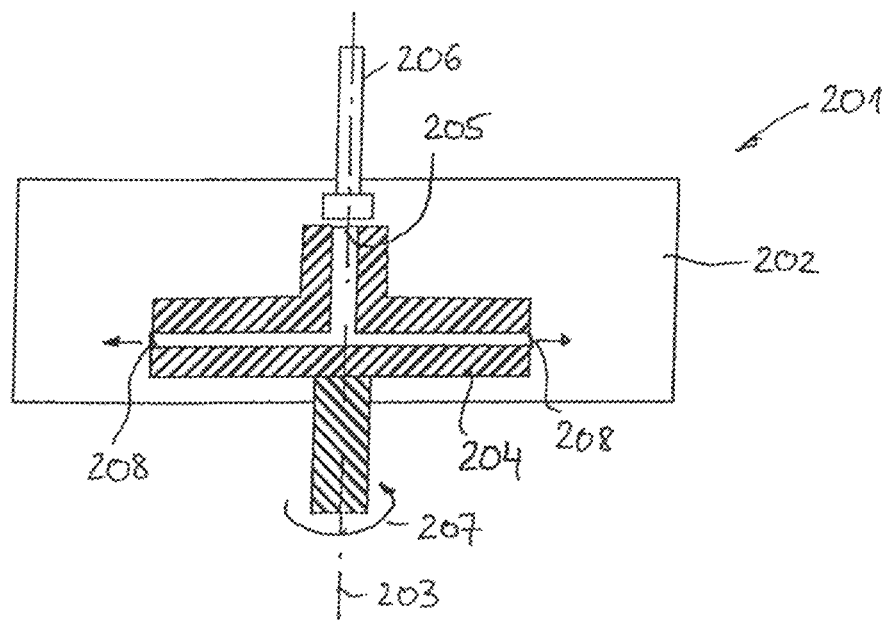
FIG. 4 shows the schematics of a first embodiment of an apparatus according to the invention for carrying out the method according to the invention.

FIG. 4 shows the schematics of a first embodiment of an apparatus 201 according to the invention with a chamber 202 filled with the reaction mixture with a gyros 204 inside, rotating around the rotational axis 203. The top aperture 205 of the gyros 204 can be closed via a valve 206. The valve 206 also serves to precisely control the flow rate or the flow resistance through the top aperture 205. If the gyros 204 is now put in motion around the rotational axis 203 in the direction of the arrow 207 using a drive, not shown, the centrifugal force will push the medium inside the gyros out through the lateral or outer apertures 208 and back into the chamber 102. This creates a vacuum inside the gyros which can be controlled with the valve 206 and the speed of the gyros 204 to produce the desired chemical reaction inside without falling below the cavitation pressure.

Figure 5:
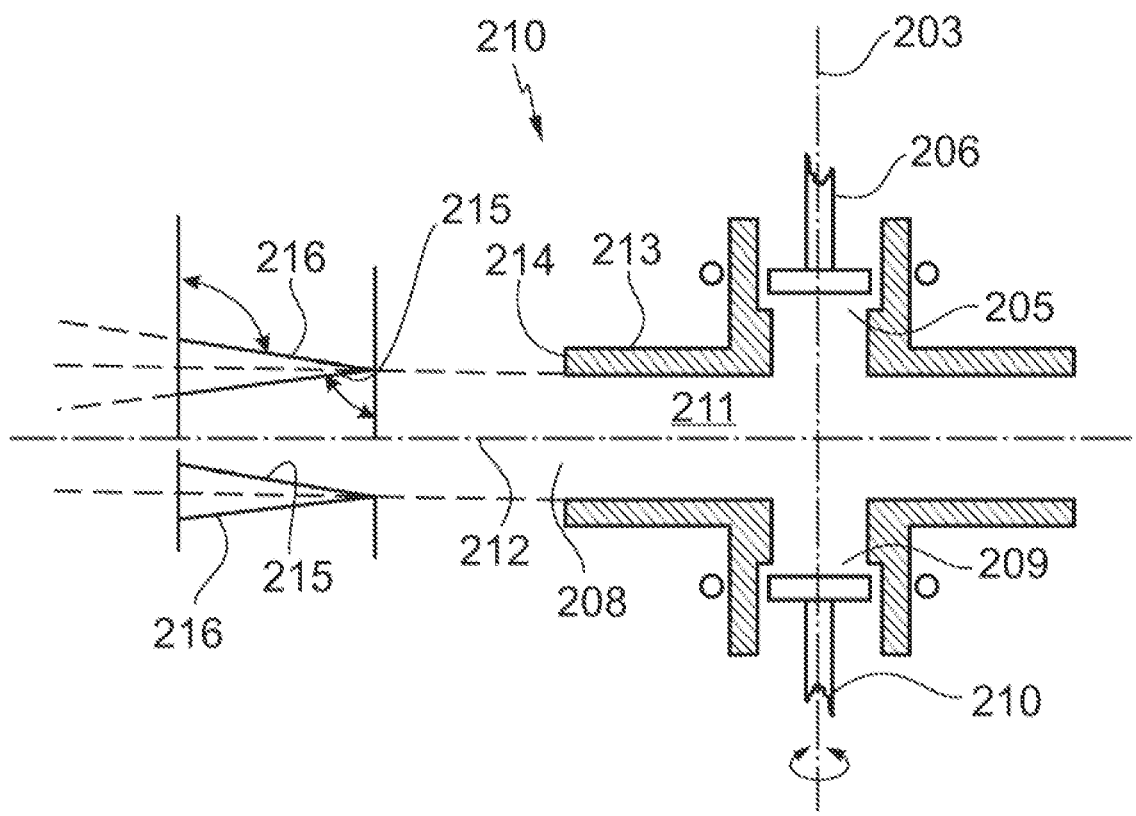
FIG. 5 shows the schematics of a second embodiment for the apparatus according to the invention.

FIG. 5 shows another embodiment 201 according to the invention. In addition to the top aperture 205 this also has an additional or bottom aperture 209 which can be dosed via a valve 210. The valves 206, 210 are opposite each other and can be moved along the rotational axis 203.

A reaction chamber 211 extends along a longitudinal axis 212 perpendicular to the rotational axis 203. The reaction chamber is delimited by a tube 213 with a circular cross-section. The tube 213 can taper and be conical at a radially outer end of the tube 214 so that the outer aperture 208 of the tube 213 has a smaller cross-sectional area than the tube 213 where the rotational axis 203 intersects the reaction chamber 2100. The lines 215 are intended to show the conical part of the tube 213. Alternatively, the tube end 214 can widen to a funnel shape as illustrated by the lines 216.

Figure 6:
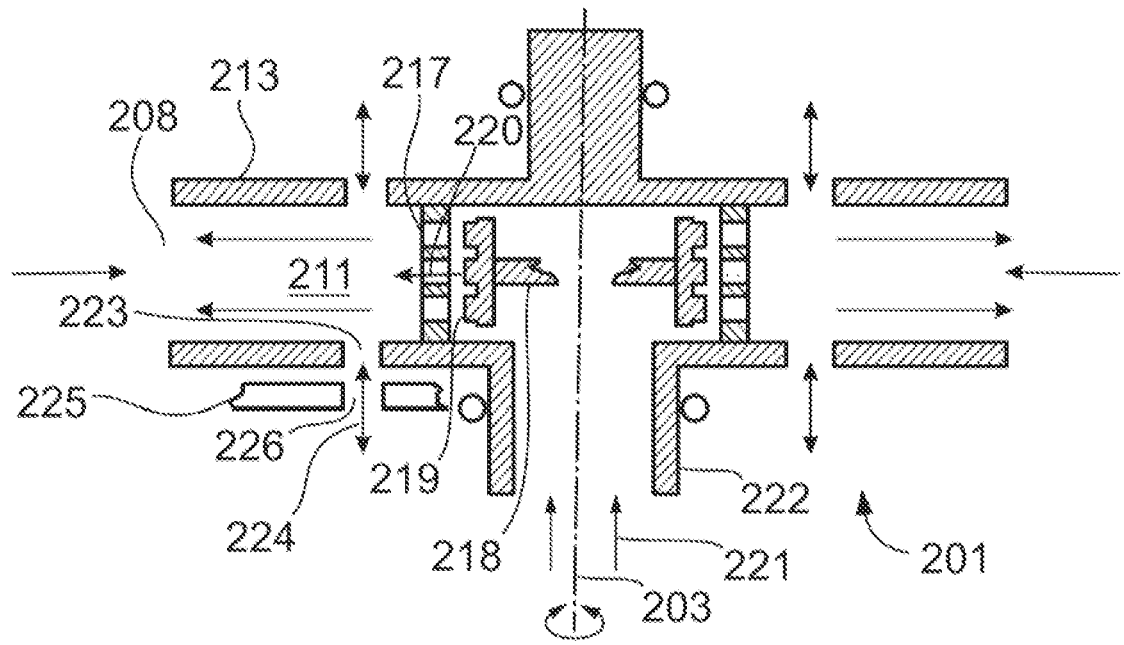
FIG. 6 shows the schematics of a third embodiment for the apparatus according to the invention.

FIG. 6 shows an embodiment of the apparatus 201 where the rotational axis 203 does not intersect the reaction chamber 212. Here too, a tube 213 forms the wall of the reaction chamber 212, and a screen 217 represents an inner radial boundary. The screen 217 can be closed via a valve 218, with individual screen pins 219 can be moved into the openings in the screen 217. Thus the reaction chamber 212 can be filled with a reactant or a portion of the reaction mixture of the chemical reaction in a radially outward direction 220 from the rotational axis 203. The arrows 221 indicate a way in which the reaction mixture can reach the valve 218 and to the screen 217, namely through a filling tube 222 coaxial to the rotational axis 203.

The reaction chamber 212 can further be filled using an aperture 223 in the tube 212, in which case the filling takes place in a direction parallel to the rotational axis 203 (see double arrow 224). The aperture 223 can be closed with the fixed perforated plate 225, which has at least one (slot) hole 226. When the slot 226 and the hole 223 overlap the reaction mixture can enter the reaction chamber 212 as indicated by the arrow 226. If there is no overlap because the apertures/holes 223, 226 are in different positions, on the other hand, the aperture 223 is closed.

Figure 7:
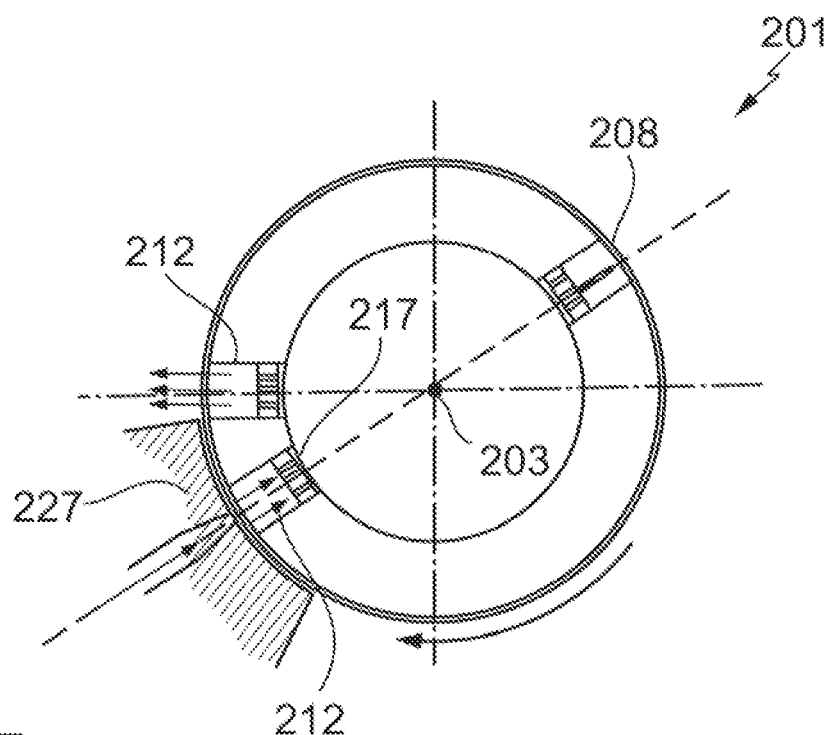
FIG. 7 shows the schematics of a fourth embodiment from above.

FIG. 7 also shows an embodiment labelled 201 where the reaction chamber 212 is also radially filled from outside. When turning around the rotational axis 203 the outer aperture 208 passes a dosing segment 227 with an injection nozzle 228. The injection nozzle 228 injects a reactant or a portion of the reaction mixture into the reaction chamber 212. In parallel, the reaction chamber can be filled with the screen 217. Once the reaction chamber 212 has passed the closing segment (see 212') the pressure inside the reaction chamber drops and the desired reaction occurs. The resulting product is centrifuged radially outward. During the phase following the closing segment the screen 217 can still be open, allowing more of the reaction mixture to enter the reaction chamber. This action can be used to control the desired pressure profile inside the reaction chamber. By controlling the discharge and/or by regulating the valves, the apparatus 201 would implement a pressure curve which corresponds with the curve shown in FIG. 2 (the force acting on the piston being proportional to the vacuum in the reaction chamber).

As already mentioned in connection with apparatus 1 in FIG. 1, an electric voltage can be applied to selectively control or influence the chemical reaction. The embodiments with rotating reaction chamber 211 can also influence the chemical reaction with a specific temporal course of the electrical voltage.

Figure 8:
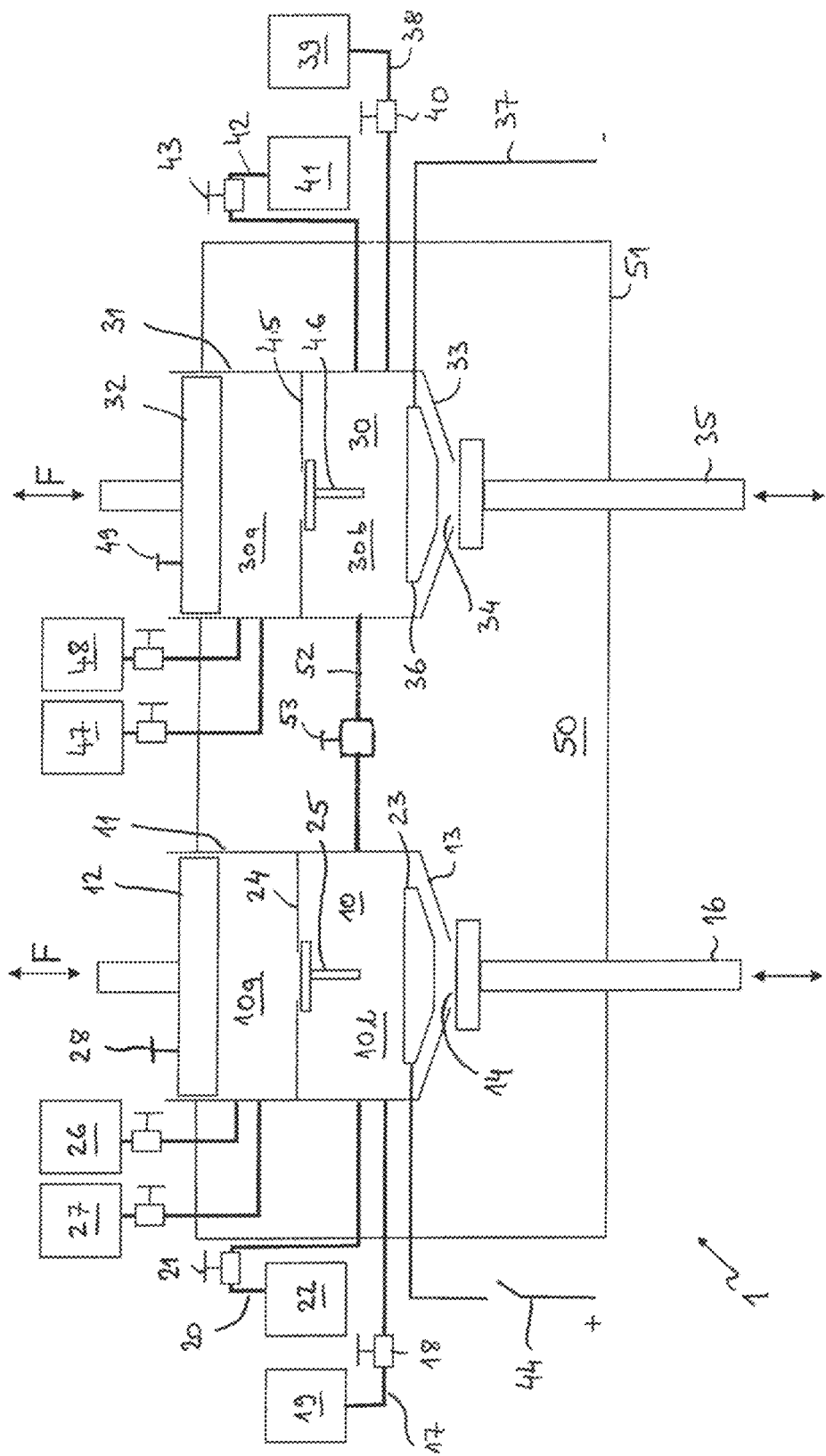
FIG. 8 shows the schematics of a modification of the apparatus from to FIG. 1

FIG. 8 shows a further apparatus 1, which is modified from the apparatus in FIG. 1. A partition 24 splits the reaction chamber 10 into two sub-chambers 10a, 10b. The partition 24 has an aperture which can be dosed by a first auxiliary valve 25. Two containers 26, 27 are connected to the sub-chamber 10a via controllable valves and supply lines. Container 27 can for example contain vegetable oil. However, the contents of container 27 can also differ from the contents of container 19. The container 26 is used to hold the product produced in the sub-chamber 10a. A bleed valve 28 allows excess air to vent whilst emptying or filling the first reaction chamber 10.

As on the first reaction chamber 10, a partition 45 also splits the second reaction chamber 30 into two chambers 30a, 30b. A second auxiliary valve 46 doses an aperture in the partition 45. The containers 47, 48 are used to hold reactants or products from the chemical reaction in sub-chamber 30a. In addition, the reaction chambers 10, 30 are connected by a line 52 which can be opened and closed via a valve 53.

The mode of operation is described using the example from the first reaction chamber 10: When the piston 12 is moved up the first auxiliary valve 25 is initially opened. The movement of the piston 12 thus causes a pressure near the cavitation pressure in sub-chambers 10a, 10b. Even if the first main valve is dosed, due to the line 52 with the open valve 53 a voltage is still present between the anode 23 and the cathode 36 inside the reaction chamber. Due to the applied voltage, anions will accumulate on the anode 23 whilst cations will accumulate on the cathode 36. In other words, particularly the sub-chamber 10b of the first reaction chamber 10 is filled with anions, and the sub-chamber 30b of the second reaction chamber 30 is filled with cations.

When dosing the first auxiliary valve 25 and valve 53 just before relaxing the pressure, the cations and anions are separated. It is further impossible for the anions in sub-chamber 10a to enter sub-chamber 10b, which has considerably fewer anions or a different nature of anions than sub-chamber 10a. By opening the valve 18 and the valve upstream from the container 27 the pressure prevailing in the sub-chambers 10a, 10b subsides in a controlled manner. The substances inside the sub-chamber 10a form into the product which is passed into the container 26 after the reaction has occurred. The anions in the sub-chamber 10b also react, resulting in a product which differs from the product from sub-chamber 10a. A similar situation occurs in the second reaction chamber 30, where atomic cations can accumulate, particularly directly on the cathode 36. Here too, the chemical reaction or the so-called 0-point when the vacuum and the applied voltage put the reactants of the chemical reaction are brought into a state of stress which actually allows the particular chemical reaction, is precisely controlled by the temporal course of the electric voltage and the matched closing of the valves described above.

For established reaction procedures it is disadvantageous and problematic that cavitation must either be ruled out or guaranteed. The excess energy generated in cavitation has not yet been identified to be a problem which weakens and affects helpful cavitation effects. In this context helpful cavitation effects are those which occur, with respect to the product yield, near the cavitation point without cavitation actually occurring (vapor bubbles forming and suddenly imploding).

This problem is first resolved by a method which provides greater kinetic by controlling the reaction to occur near the cavitation point, preferably supported by electric fields and/or currents. A greater yield of kinetically controlled products which are considerably more valuable and versatile as metastable, reactive compounds become available at a lower cost. This particularly allows fuels to be refined more cost-effectively.

LIST OF REFERENCE NUMBERS

1 Apparatus
10 First reaction chamber
11 Cylinder
12 Piston
13 End
14 Aperture
16 First main valve
17 Supply line
18 Valve
19 Container
20 Supply line
21 Valve
22 Container
23 Anode
24 Partition
25 First auxiliary valve
26 Container
27 Container
28 Bleeder valve 30 Second reaction chamber
31 Cylinder
32 Piston
33 End
34 Aperture
35 Second main valve
36 Cathode
37 Circuit
38 Supply line
39 Container
40 Valve
41 Container
42 Supply line
43 Valve
44 Switch
45 Partition
46 Second auxiliary valve
47 Container
48 Container
49 Bleeder valve
50 Connecting chamber
51 Container
52 Line
53 Valve
101 Apparatus
102 Reaction chamber
103 First pre-chamber
104 Second pre-chamber
105 Aperture
106 Arrow
107 Aperture
108 Arrow
109 First nozzle
110 Valve
111 Second nozzle
112 Valve
113 Outlet
114 Aperture
115 Valve
201 Apparatus
202 Chamber
203 Rotational axis
204 Gyros
205 Top opening
206 Valve
207 Arrow
208 Aperture
209 Bottom opening
210 Valve
211 Reaction chamber
212 Longitudinal axis
213 Tube
214 End
215 Line
216 Line
217 Screen
218 Valve
219 Screen pins
220 Direction
221 Arrow
222 Inlet port
223 Aperture
224 Double arrow
225 Perforated disc
226 Aperture
227 Closing segment While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for producing kinetically controlled products comprising:
   subjecting at least one reactant present in a liquid phase to a pressure change from a minimum pressure without causing cavitation in the at least one reactant;
   subjecting the at least one reactant to at least one pressure reduction followed by at least one pressure increase, wherein the at least one pressure decrease does not reach cavitation pressure;
   subjecting the at least one reactant to a mechanical vibration, at least one soundwave and/or at least one electromagnetic wave;
   producing at least one kinetically controlled product; and
   wherein a pressure minimum ranges from 100.3% to 105% of a cavitation pressure of the reactant.

2. The method of claim 1 wherein the at least one kinetically controlled product is a fuel.

3. The method of claim 1, further comprising multiple reactants, at least one of which is in a liquid phase.

4. The method of claim 1, wherein the pressure difference between minimum pressure and cavitation pressure is less than 20 mbar.

5. The method of claim 1, wherein the at least one pressure reduction occurs in less time than the time for the at least one pressure increase.

6. The method of claim 1, wherein the at least one reactant is introduced at least partially frozen and subsequently converting the at least partially frozen reactant to its liquid phase.

7. The method of claim 1, further comprising wherein production occurs without macroscopic motion of the at least one reactant.

8. The method of claim 1, wherein the method comprises a continuous process.

9. The method of claim 1, wherein the at least one reactant includes at least one component selected from the group consisting of nanoscale solid, nanoscale silicon, metal hydroxide, metal compound, semimetal compound, ice, ceramic catalyst support, nanoscale catalyst, carbon dioxide, ammonia, hydrogen sulphide, water, carbon disulphide, carbon monoxide, hydrogen, oxygen, nitrogen, generator gas, helium, argon, neon, welding gas, molecules and/or compounds with dipole moment, ionic compounds, and/or salts; and
   wherein any solid material is provided as part of the liquid phase or part of an at least partially frozen phase which is subsequently converted into its liquid phase.

10. The method of claim 1, wherein the at least one kinetically controlled product is selected from the group consisting of hydrocarbon, amino acid, protein, peptide, glycerin, fatty acid, fat, sugar, alcohol, vitamin, ammonia, nanoscale solids, nanoscale silicon, petroleum ether, hydrogenated hydrocarbon, molecules and/or compounds with dipole moment, ionic compounds, and/or salts.

* * * * *